United States Patent
Chitty et al.

(10) Patent No.: US 12,434,218 B2
(45) Date of Patent: Oct. 7, 2025

(54) PORE STRUCTURE FOR SEPARATION OF ADENO-ASSOCIATED VIRUSES (AAVS) FROM THEIR AGGREGATES

(71) Applicant: Phenomenex, Inc., Torrance, CA (US)

(72) Inventors: Michael Chitty, Torrance, CA (US); Tivadar Farkas, Torrance, CA (US); Ismail Rustamov, Redondo Beach, CA (US); James Song, Buena Park, CA (US); Zhengfei Sun, Buena Park, CA (US); Cal H. Weeks, San Pedro, CA (US); Shilin Lok Yee Cheung, Torrance, CA (US)

(73) Assignee: Phenomenex, Inc., Torrance, CA (US)

( * ) Notice: Subject to any disclaimer, the term of this patent is extended or adjusted under 35 U.S.C. 154(b) by 0 days.

(21) Appl. No.: 18/599,879

(22) Filed: Mar. 8, 2024

(65) Prior Publication Data

US 2025/0170553 A1   May 29, 2025

Related U.S. Application Data

(60) Provisional application No. 63/603,339, filed on Nov. 28, 2023.

(51) Int. Cl.
   *B01J 20/10*   (2006.01)
   *B01J 20/28*   (2006.01)
   (Continued)

(52) U.S. Cl.
   CPC .......... *B01J 20/103* (2013.01); *B01J 20/283* (2013.01); *B01J 20/3248* (2013.01); *C12N 7/00* (2013.01);
   (Continued)

(58) Field of Classification Search
   CPC .... B01J 20/103; B01J 20/283; B01J 20/3248; B01J 20/28073; B01J 20/28085; B01J 20/28095; C12N 7/00
   See application file for complete search history.

(56) References Cited

U.S. PATENT DOCUMENTS

| | | | |
|---|---|---|---|
| 4,415,631 A | * | 11/1983 | Schutijser ............ B01J 20/3092 428/404 |
| 9,308,520 B2 | | 4/2016 | Ekeroth |

(Continued)

FOREIGN PATENT DOCUMENTS

| | | | |
|---|---|---|---|
| CN | 113009056 A | * 6/2021 | ............ G01N 30/02 |
| EP | 3 644 055 A1 | 4/2020 | |

(Continued)

OTHER PUBLICATIONS

Farrell ("Optimizing Protein Aggregate Analysis by SEC") BioPharm International, BioPharm International—Oct. 1, 2017, vol. 30, Issue 10 pp. 46-47, 50-51 (Year: 2017).*

(Continued)

*Primary Examiner* — Jennifer Wecker
*Assistant Examiner* — Jonathan Bortoli
(74) *Attorney, Agent, or Firm* — Kinney & Lange, P.A.

(57) ABSTRACT

Disclosed are methods of making a porous particle material for use as stationary media and related chromatographic separation devices utilizing the disclosed stationary media. The porous particle material has a pore volume that yields improved stability and column lifetime, and additionally has a modified surface, resulting in a surface modified porous particle material that improves the separation of AAVs from their aggregates in the samples to be tested.

4 Claims, 7 Drawing Sheets

(51) Int. Cl.
*B01J 20/283* (2006.01)
*B01J 20/32* (2006.01)
*C12N 7/00* (2006.01)

(52) U.S. Cl.
CPC .... *B01J 20/28073* (2013.01); *B01J 20/28085* (2013.01); *B01J 20/28095* (2013.01)

(56) References Cited

U.S. PATENT DOCUMENTS

| | | | |
|---|---|---|---|
| 9,587,009 B2 | 3/2017 | Bian et al. | |
| 10,124,328 B2 | 11/2018 | Hansson et al. | |
| 11,123,656 B2 | 9/2021 | Sasuga et al. | |
| 11,229,896 B2 | 1/2022 | Gu et al. | |
| 11,512,146 B2 | 11/2022 | Barin et al. | |
| 2004/0152183 A1* | 8/2004 | O'Riordan | A61P 43/00 435/239 |
| 2013/0135610 A1 | 5/2013 | Bouvier et al. | |
| 2014/0319057 A1* | 10/2014 | Brousmiche | B01J 20/22 210/656 |
| 2014/0367338 A1* | 12/2014 | Gu | B01D 15/265 29/407.01 |
| 2015/0024411 A1 | 1/2015 | Stadler | |
| 2015/0133294 A1 | 5/2015 | Wyndham et al. | |
| 2016/0332142 A1 | 11/2016 | Gu et al. | |
| 2019/0234844 A1 | 8/2019 | Stadler | |
| 2019/0376933 A1* | 12/2019 | Wyndham | B01D 15/34 |
| 2020/0282378 A1* | 9/2020 | Cong | B01J 20/324 |
| 2022/0080385 A1 | 3/2022 | Lawrence et al. | |
| 2022/0081468 A1 | 3/2022 | Schmudlach et al. | |
| 2022/0275358 A1 | 9/2022 | Zhi et al. | |
| 2023/0182114 A1 | 6/2023 | Sarisozen et al. | |
| 2023/0183658 A1 | 6/2023 | Mercaldi et al. | |
| 2023/0303983 A1 | 9/2023 | Florea et al. | |
| 2024/0033714 A1* | 2/2024 | Chitty | B01J 20/28073 |

FOREIGN PATENT DOCUMENTS

| | | |
|---|---|---|
| WO | 2011/084506 A2 | 7/2011 |
| WO | 2015/109068 A1 | 7/2015 |
| WO | 2016/066569 A1 | 5/2016 |
| WO | 2019/202994 A1 | 10/2019 |
| WO | 2022/061035 A1 | 3/2022 |
| WO | 2022/061039 A1 | 3/2022 |
| WO | 2022/071990 A1 | 4/2022 |
| WO | 2022/162967 A1 | 8/2022 |
| WO | 2022/204670 A2 | 9/2022 |
| WO | 2023/077085 A2 | 5/2023 |

OTHER PUBLICATIONS

Green "Columns—What is on Your HPLC Particle? A Look at Stationary Phase Chemistry Synthesis"). LCGC Asia Pacific LCGC Asia Pacific—Mar. 5, 2021 vol. 24 Issue 1 (Year: 2021).*
Lundqvist ("Fundamentals of size exclusion chromatography How size exclusion chromatography (SEC) works and how you use it to purify proteins") Size Exclusion Chromatography | Cytiva 12—(Oct. 22, 2022).*
Chinese Publication No. CN 113009056, English translation). 2024 (Year: 2024).*
Silicycle (How to Choose the right Chromatographic Phase?) (Year: 2021).*

* cited by examiner

PORE STRUCTURE FOR SEPARATION OF ADENO-ASSOCIATED VIRUSES (AAVS) FROM THEIR AGGREGATES

INTRODUCTION

The invention relates to size exclusion chromatography columns utilizing pore size porous particles as the stationary phase for the separation of adeno-associated viruses from their aggregates.

FIELD OF INVENTION

The present disclosure relates chromatography columns. More specifically, the present disclosure relates size exclusion chromatography columns utilizing pore size porous particles as the stationary phase for the separation of adeno-associated viruses from their aggregates.

BACKGROUND

Size exclusion chromatography (hereinafter "SEC") is the general name given to chromatographic separation techniques that involve liquid chromatography for the separation of macromolecules based on molecular size. SEC has become synonymous with other such chromatographic technique names, including as gel permeation chromatography (GPC), gel filtration chromatography (GFC), and steric exclusion chromatography.

The primary purpose and use of SEC techniques is to provide molecular weight distribution data about a biomolecule or synthetic molecules, for example, monoclonal antibodies, proteins, and polymer molecules. If a sample of interest contains a mixture of multiple molecules, the sample is injected at the head of a SEC column and a liquid mobile phase is passed through the column at a fixed flow rate, setting up a pressure gradient across its length. The column includes packing material which is typically porous, with a controlled pore size. As the sample passes through the packing material (the stationary phase), the small macromolecules are able to penetrate the pores of the packing material, but the larger molecules are too large to enter the pores and remain in the interstitial space. The larger molecules therefore flow more rapidly down the length of the column, while the smaller molecules are able to reside within and enter through the pores of the packing material. Due to their size difference, the various molecules are separated as they move down the column, and exit (elute) at different times. These various sized molecules are therefore separated and represented into distinct chromatographic bands.

When selecting a stationary phase medium there are several criteria to consider in SEC separation techniques. Firstly, the packing material should not interact chemically with the sample. Secondly, it must be mechanically stable and able to withstand operating temperatures and high operating pressures. Furthermore, it must have sufficient pore volume and an adequate range of pore sizes to resolve the sample's molecular weight distribution.

For High Performance SEC, meaning high pressure, the typical packing materials used are semi-rigid polymeric gels, or rigid modified silica particles. In general, rigid silica packing have several advantages over semi-rigid gel packing; they are tolerant of a greater variety of mobile phases, they are stable at elevated temperatures which be required to characterize certain polymers, and their pore sizes are more easily defined. However, silica-based packing do suffer from certain drawbacks, such as unwanted adsorptive effects, and some stability concerns under high operating pressures, particularly for smaller sized particles. This is particularly of concern, as the silica particles utilized in modern day packing materials are required to have specific size parameters to achieve the separation of biologics from their aggregates. One parameter, for example, is size, such as 1.8 µm.

As the technology in this field has progressed, so have the demands on the chromatographic equipment. Higher pressure operations and reduced column sizes have been introduced for the purpose of speeding up the run time and obtaining quicker results. Currently, a typical column length is 30-50 mm, with a 2.0-10.0 mm diameter, and the particle sizes used for the stationary phase are commonly 3 µm and below. A decrease in particle size allows for a decrease in the column length, which in turn results in faster runs and overall time savings, in addition to increased chromatographic resolution.

However, various challenges are present with respect to decreased particle sizes for the stationary phase. Because modern chromatographic equipment is operated at higher pressures than before, the structural and mechanical integrity of the stationary phase particles has become increasingly important. The particles need to be mechanically strong to handle the repeated high pressures they are subjected to during the lifetime of a column. The longevity of the column is directly affected by the stability of the packed particles, and with increased number of runs, the packed particles in the stationary phase can experience particle breakdown.

In particular, with respect to fully porous particles, the structural and/or mechanical stability of the particle is effected by the pore volume present in the particle. As a general principle, the lower the pore volume of a particle the stronger and more stable the particle is under a high pressure environment. Conventional fully porous silica particles that are commonly used in today's chromatographic applications can have a porosity characterized by a pore volume of 1.4-1.8 cc/g. Smaller particles in the 1.6-1.8 µm range, the mechanical stability is highly effected by the porosity of the particle, as these particles experience breakdown more easily, and thereby affect the lifetime and the result reliability of the column. The porosity of the particles therefore has become an important factor in determining the lifetime of the equipment and the reliability of the results. As such, reducing the porosity of fully porous particles to make them more mechanically stable, but also including the specific pore size desired, is of high interest in the industry.

Additionally, it is known that silica has a strong affinity toward polar solutes, which results in less than ideal packing material attributes when it comes to size exclusion chromatography. The amorphous nature of silica is reflected in the random distribution of various chemical structures on the surface. A silica particle typically has silanol groups (Si—OH) on the surface. Often, the silica is heated which can condense the bound silanol groups and results in the formation of siloxane bonds. There are free and bound silanol groups on the surface, and the free silanol groups constitute the premier adsorption and reaction sites on the surface of silica particles.

When it comes to the size exclusion of molecules such as proteins, these potential reaction sites contribute to what is commonly termed "non-size effects", which generally includes all factors that affect the retention of proteins on SEC columns, other than the classic partitioning of solutes between pore volume and interstitial volume. These non-size effects include for example attractive interactions, such as ion-exchange and hydrophobic binding, which tend to increase the elution volumes of solutes, thus causing them to appear smaller than they actually are. Another interaction that occurs is electrostatic repulsion (ion exclusion) which has the effect of denying otherwise accessible volumes to the solutes, thereby causing them to appear larger than they are.

For the foregoing reasons, there exist a need for an SEC packing material that is more mechanically stable, particularly in high pressure operations, and the packing material is modified to avoid ion exchange interactions and reverse phase interactions which are known to distort chromatographic results and accuracy. Moreover, there is a need to provide packing material to a column where the pore structure for separating out biologics, such as adeno-associated viruses (AAVs) from their aggregates will provide additional run times and improved resolution. The description herein achieves these current deficiencies in SEC marketplace.

The invention described herein is directed to devices and methods for performing SEC. Embodiments of the present disclosure operate at normal high performance liquid chromatography pressures (HPLC) as well as at Ultra High performance liquid chromatography pressures (UHPLC), which extend from about 1,000 psi to about 10,000 psi and greater and fast flow rates to speed the time of analysis. Embodiments described herein feature a stationary phase which has a well-defined pore structure and particle size to produce highly reproducible results. The inventions described herein also include methods of making SEC stationary phase material with increased mechanical stability and modified surface chemistries that minimize adsorption interactions of samples with the stationary phase material. Also disclosed are chromatographic separations devices using the improved stationary phase materials.

In one embodiment of the present disclosure, a method of making a stationary media (column packing material) is disclosed. In this embodiment the stationary media is a porous particle material. The porous particle material has initial characteristics and morphology, such as an initial pore volume, initial pore diameter, initial pore size, and initial average diameter, initial surface chemistry etc. The method comprises the steps of:
 a. reducing the pore volume of the particle material from an initial pore volume to a final pore volume;
 b. hydrating the porous particle material; and
 c. chemically modifying the porous particle material with a hydrophilic organosilane compound to obtain a surface modified porous particle material.

In one embodiment, in the first step of the disclosed method a stock material of porous particles is provided with initial dimensions and morphology. In some embodiments, the porous particle material comprises Silica particles ($SiO_2$). For particular Size Exclusion separations, depending on the molecules of interest, specific parameters are desired in terms of the stationary phase particle materials. In certain embodiments, those parameters include a specific desired pore volume, which is smaller than the pore volume of currently available stock silica materials. So a pore volume reduction step is performed so as to reduce the pore volume of the particle material from an initial pore volume to a final pore volume.

In one embodiment, the step of reducing the pore volume of the particle material comprises treating the particle material. This treatment of the particle material surface results in dehydrating the particle material. Specifically relating to silica particles, a surface treatment step results in a dehydroxylation reaction occurring on the surface of the silica particles. The surface of the particles has silanol groups (Si—OH), which can be condensed after processing.

The step of reducing the pore volume of the particle material is critical to providing a stationary phase material that is structurally and mechanical more stable than currently available materials, and is capable of withstanding high operating pressures, without experiencing particle breakdown. A more mechanically stable particle material results in allowing separation devices to be operated at higher pressures, and thus yielding faster results. It also results in a longer lifetime of a separation column which allows for more samples to be run prior to the column having to be replaced.

The particle material can be comprised of particles having an average diameter size in the range of about 2.8-3.2 μm. In one embodiment, the particle diameter is in the range of about 2.9-3.1 μm. In a further embodiment, the particle diameter is about 3.0 μm. In related embodiments, the average particle diameter is about 2.9 μm. In a further embodiment, the average particle diameter is about 3.0 μm. In an even further embodiment, the average particle diameter is about 3.1 μm.

In other related embodiments, the particle material comprises particles that have a porosity characterized by an initial pore volume in the range of 0.4 to 1.1 cc/g. In other embodiments, the initial pore volume is in the range of 0.6 to 1.0 cc/g, or any value therebetween. In further embodiments the initial pore volume is in the range of 0.7 to 0.9 cc/g, 0.8 to 0.9 cc/g, or any value therebetween.

In some related embodiments, the particle material comprises particles that have a porosity characterized by an initial pore size in the range of 500-800 Angstroms (Å). In other embodiments, the initial pore size is in the range of 550-750 Å, or any value therebetween. In further embodiments the initial pore size is in the range of 600-700 Å, or any value therebetween.

When the first step of the disclosed methods is carried out, the resulting particle material has a reduced porosity characterized by a final pore volume in the range of 0.5 to 1.0 cc/g, or any value therebetween. In some embodiments, the final pore volume can be reduced in the range of 0.6 to 0.9 cc/g, or any value therebetween.

After treatment of the particle martial, the final pore size have a porosity characterized by a final pore size in the range of 600 to 800 Angstroms (Å). In other embodiments, the final pore size is in the range of 650 to 750 Å, or any value therebetween. In further embodiments, the final pore size is in the range of 630 to 680 Å, or any value therebetween.

The optional secondary step of the methods disclosed herein comprises a step of hydrating the particle material, which has already undergone the optional pore reduction, via processes such as thermal processing The step of hydrating the particle material is carried out so as to reintroduce functionality to the surface of the particle material, for further chemical bonding that will occur during the subsequent chemical surface modification step.

Once the hydrating step has been completed the silica particle material can the processed with a bonding step. The bonding step is carried out so as to ensure that the surface functionality of the particle material is such that ion exchange interactions and reverse phase interactions are prevented during the time that the sample interacts with the particle material within a separation column.

In one embodiment the bonding step uses a hydrophilic organosilane compound as a reagent for conducting the chemical modification of the silica particles surface. This resulting hydrophilic surface has —OH groups making particle matching in polarity to the aqueous mobile phase, thereby reducing chemical interactions with the molecules contained within the sample. The surface modification also sterically blocks silanol groups remaining on the silica surface reducing ion exchange interactions with the molecules of interest contained in the sample to be tested.

The bonding steps in the present disclosure are carried out in aqueous solution. Most of silane bonding known in the art are carried out in aprotic solvents, however, the inventors of the present disclosure found out that this step can instead be carried out simply in an aqueous solution within controlled pH range.

In an embodiment of the present disclosure the step of chemically modifying the surface of the porous particle material with a hydrophilic compound comprises:

a. preparing an aqueous bonding solution with controlled pH range;
b. adding the hydrophilic organosilane compound to the aqueous solution;
c. adding the porous particle material to the mixture of step b) and bonding hydrophilic organosilane compound with the surface of the porous particle material and obtaining a surface modified porous particle sorbent.

In other embodiments, the step of chemically modifying the surface of the porous particle material with a hydrophilic compound comprises combining the reaction solvents and reagents in the following specific amounts:

a. preparing 6× amount of DI water; mixing ⅓× amount of hydrophilic organosilane compound with DI water
b. adding the aqueous mixture to 1× amount of porous silica particles
c. adjusting pH of aqueous slurry mixture to 7 with about 0.15× of 1N NaOH
d. reacting the hydrophilic organosilane compound with 1× of the porous particle material, to obtain a surface modified porous particle material.

The value X represents the amount porous particle material by weight. The following example illustrates in more detail the chemical surface modification procedure that is performed on the porous particle material.

In other embodiments, a chromatographic separation device is disclosed, which comprises:

at least one columnar member having an inner void;
at least one stationary packing material within the inner void; wherein the stationary packing material comprises a reduced pore volume and surface modified particle material, according to the methods disclosed herein.

In certain embodiments, the stationary packing material comprises silica particles, having an average pore volume of about 0.5 to 1.0 cc/g, or any value therebetween. In some embodiments, the final pore volume can be reduced in the range of 0.7 to 0.9 cc/g, or any value there between.

In some embodiments, the chromatographic separation device is an SEC device or a Gel Filtration Chromatography device (GFC). GFC is used to separate large macromolecules such as antibodies, immunoglobulins, protein complexes, protein aggregates, peptides, and other biomolecules. In gel filtration chromatography, the compounds of interest in the sample move and filter through the stationary phase based on their molecular size. Typically aqueous solvents are used in the mobile phase to ensure that the compound of interest maintains biological integrity. Gel filtration columns can separate biomolecules that range from 10 to 5000 kD in size. Gel filtration chromatography columns require a GFC stationary packing material that has low surface activity, high efficiency, and consistent uniform pore size. In some example embodiments, the SEC column can separate out biomolecules in the range of 10 to 4000 kD. In other related embodiments the SEC column can separate out biomolecules in the range of 100 to 3000 kD. In other related embodiments the SEC column can separate out biomolecules in the range of 200 to 2000 kD. In other related embodiments the SEC column can separate out biomolecules in the range of 300 to 1,500 kD. In other related embodiments the SEC column can separate out biomolecules in the range of 1,000 to 3,000 kD.

In some embodiments described herein, the columnar member of the chromatographic separation device has length of 100 mm, 150 mm, or 300 mm.

Notation and Nomenclature

The term "about" is used in conjunction with numeric values to include normal variations in measurements as expected by persons skilled in the art, and is understood to have the same meaning as "approximately" and to cover a typical margin of error, such as ±15%, ±10%, ±5%, ±1%, ±0.5%, or even ±0.1% of the stated value. The term "about" also encompasses amounts that differ due to different equilibrium conditions for a composition resulting from a particular initial composition. Whether or not modified by the term "about," the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes having two or more compounds that are either the same or different from each other. It should also be noted that the term "or" is generally employed in its sense including "and/or" unless the content clearly dictates otherwise. As used herein, "and/or" refers to and encompasses any and all possible combinations of one or more of the associated listed items, as well as the lack of combinations when interpreted in the alternative ("or").

In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

The term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

The term "comprise," "comprises," and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising."

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

As used throughout this description, and in the claims, a list of items joined by the term "at least one of" or "one or more of" can mean any combination of the listed terms. For example, the phrase "at least one of X, Y or Z" can mean X; Y; Z; X and Y; X and Z; Y and Z; or X, Y and Z.

Full details of the present disclosure are set forth in the following description and illustrated in the accompanying drawings.

DETAILED DESCRIPTION

Figure 1:
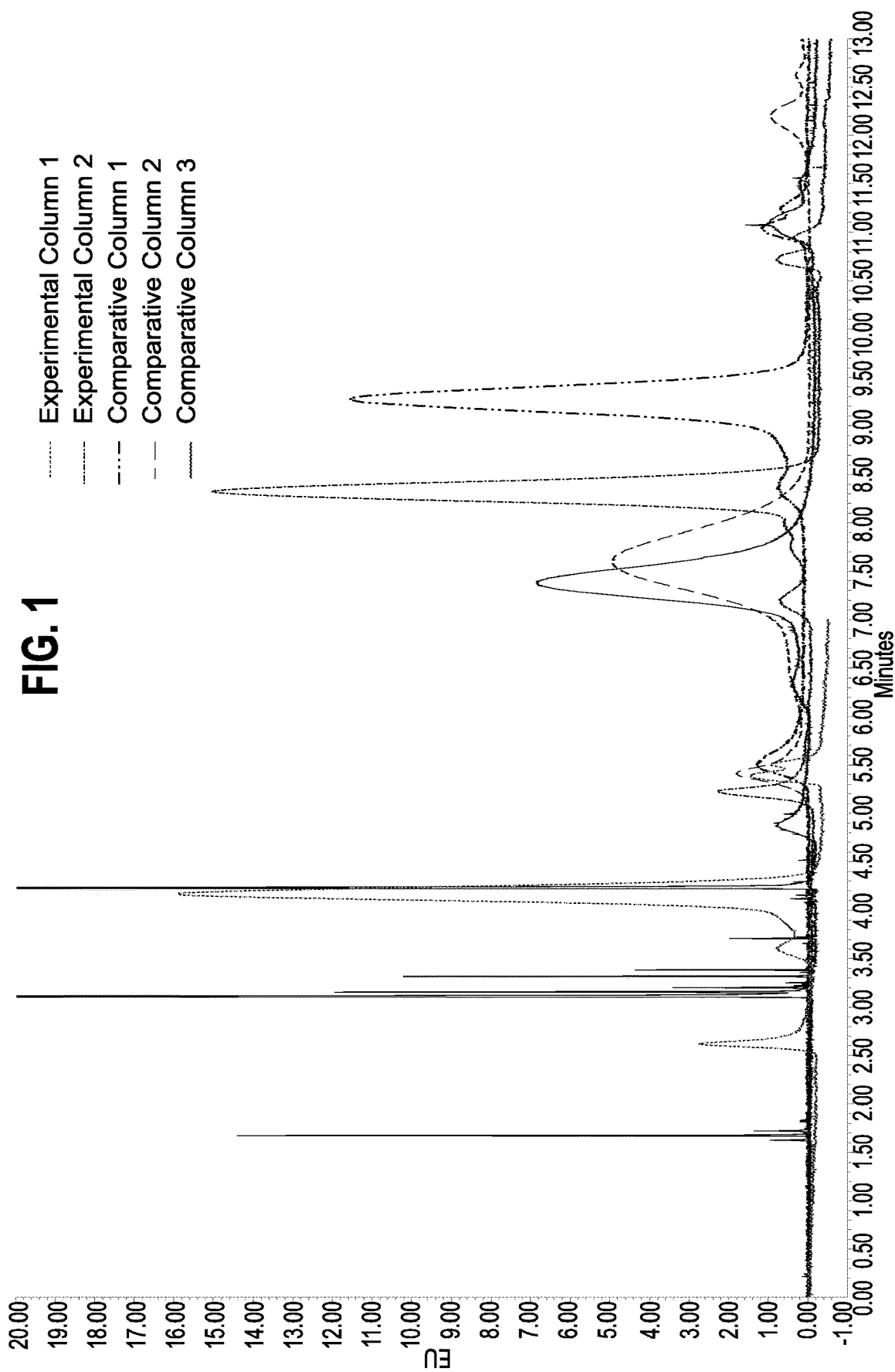
FIG. 1 depicts chromatograms showing AAV2 separation using various embodiments of the invention compared to alternative SEC columns.

The present disclosure relates to methods of making SEC packing materials with increased mechanical stability and modified surface chemistries that minimize adsorption interactions of samples with the packing material. Also disclosed are chromatographic separations devices using the improved stationary phase materials. The packing materials are especially advantageous in separating AAVs from their aggregates.

In one embodiment of the present disclosure, a method of making a stationary media (column packing material) is disclosed. In this embodiment the stationary media is a porous particle material. The porous particle material has initial characteristics and morphology, such as an initial pore volume, initial pore diameter, initial pore size, and initial average diameter, initial surface chemistry etc. The method comprises the steps of:
  a. the particle material having an initial pore volume;
  b. optionally, hydrating the porous particle material; and
  c. chemically modifying the surface of the porous particle material with a hydrophilic compound to obtain a surface modified porous particle material.

In one embodiment, in the first step of the disclosed method a stock material of porous particles is provided with initial dimensions and morphology. In some embodiments, the porous particle material comprises Silica particles (SiO2). For particular Size Exclusion separations, depending on the molecules of interest, specific parameters are desired in terms of the stationary phase particle materials. In certain embodiments, those parameters include a specific desired pore volume, which is smaller than the pore volume of currently available stock silica materials. So a pore volume reduction step is performed so as to reduce the pore volume of the particle material from an initial pore volume to a final pore volume.

The present disclosure provides for a Size Exclusion separation of aggregates from molecules selected from a group comprising adeno-associated virus (AAV), monoclonal antibodies, immunoglobulins, protein complexes, protein aggregates, parvovirus, peptides, biomolecules, or a combination thereof.

In one embodiment the step of reducing the pore volume of the particle material comprises thermally treating the particle material. This thermal treatment of the particle material results in dehydrating the particle material. Specifically relating to silica particles, a thermal treatment step results in a dehydroxylation reaction occurring on the surface of the silica particles. The surface of the particles contains silanol groups (Si—OH), which can be removed upon thermal processing, typically in temperatures higher than 400° C., through the process of dehydroxylation. During this process, the bonds of the OH group and a hydrogen from an adjacent silanol, break away to form water as a result of a condensation reaction. This gives rise to siloxane Si—O—Si bridges. As the particles undergo this thermal treatment, and as the silanol groups are being removed, it is believed that the resulting siloxane bridges (Si—O—Si) forming inside the pores at the pore-solid interfaces likely give rise to rougher pore-solid interfaces and decrease the internal pore dimensions, thereby decreasing the pore size and pore volume.

The step of reducing the pore volume of the particle material is critical to providing a stationary phase material that is structurally and mechanical more stable than currently available materials, and is capable of withstanding high operating pressures, without experiencing particle breakdown. A more mechanically stable particle material results in allowing separation devices to be operated at higher pressures, and thus yielding faster results. It also results in a longer lifetime of a separation column which allows for more samples to be run prior to the column having to be replaced.

In some related embodiments, the particle material comprises particles that have a porosity characterized by an initial pore size in the range of 500-800 Angstroms (Å). In other embodiments, the initial pore size is in the range of 550-750 Å, or any value therebetween. In further embodiments, the initial pore size is in the range of 600-700 Å, or any value therebetween. After surface treatment of the particle martial, the final pore size have a porosity characterized by a final pore size in the range of 600 to 800 Angstroms (Å). In other embodiments, the final pore size is in the range of 650 to 750 Å, or any value therebetween. In further embodiments, the final pore size is in the range of 630 to 680 Å, or any value therebetween.

When the above disclosed methods is carried out, the resulting particle material has a reduced porosity characterized by a final pore volume in the range of 0.5 to 1.0 cc/g, or any value therebetween. In some embodiments, the final pore volume can be reduced in the range of 0.6 to 0.9 cc/g, or any value therebetween.

The particle material can be comprised of particles having an average diameter size in the range of about 1.0-10 μm. In one embodiment, the particle diameter is in the range of about 1.2-8.0 μm. In a further embodiment, the particle diameter is in the range of about 1.4-7.0 μm. In another embodiment, the particle diameter is in the range of about 1.6-6.0 μm. In a further embodiment, the particle diameter is in the range of about 1.8-4.5 μm. In an even further embodiment, the particle diameter is in the range of about 2.5-3.5 μm.

In other related embodiments, the particle material comprises particles that have a porosity characterized by an initial pore volume in the range of 0.4 to 1.1 cc/g. In other embodiments, the initial pore volume is in the range of 0.6 to 1.0 cc/g, or any value therebetween. In further embodiments the initial pore volume is in the range of 0.7 to 0.9 cc/g, 0.8 to 0.9 cc/g, or any value therebetween.

When the first step of the disclosed methods is carried out, the resulting particle material has a reduced porosity characterized by a final pore volume in the range of 0.5 to 1.0 cc/g, or any value therebetween. In some embodiments, the final pore volume can be reduced in the range of 0.6 to 0.9 cc/g, or any value there between.

The methods disclosed herein comprises a step of hydrating the particle material, which has already undergone the pore reduction thermal processing step. The step of hydrating the particle material is carried out so as to reintroduce functionality to the surface of the particle material, for further chemical bonding that will occur during the subsequent bonding step. Since —OH groups are removed during the dehydroxylation reactions occurring in the thermal treatment of the particle material, once the pore reduction has taken place, some —OH groups need to be reintroduced on the surface of the silica particles so that the hydrophilic substance used in the bonding step has a reaction site to bond to on the surface of the silica particle.

Therefore, in one embodiment of the present disclosure, the particle material, now having a reduced pore volume, undergoes an optional hydrating step wherein the porous particle material is sonicated with water for a period of time, then this aqueous particle mixture is added to a reactor and refluxed with a hydrofluoric acid (HF) solution. In the case of silica particles, Hydrofluoric acid solution breaks up strong Si—O bonds on the surface of the silica particles, and this allows for available reaction sites in a subsequent bonding step.

Therefore, in another embodiment of the present disclosure, the particle material, is not thermal processes and undergoes a hydrating step wherein the porous particle material is sonicated with water for a period of time, then this aqueous particle mixture is added to a reactor and refluxed with a hydrofluoric acid (HF) solution. In the case of silica particles, Hydrofluoric acid solution breaks up strong Si—O bonds on the surface of the silica particles, and this allows for available reaction sites in a subsequent bonding step.

Once this optional hydrating step is completed, the particle material has post-hydration parameters which include a post-hydration pore volume (cc/g) and post hydration pore sizes (Angstroms), examples of which are shown in Table 1 below. Table 1 outlines various particle material parameters, including the silica particle pore volumes (P.V), pore size (P.S) and internal pore surface areas (S.A).

TABLE 1

| | Silica particles | | |
|---|---|---|---|
| # | Surface Area (S.A) (m2/g) | Pore Volume (P.V.) (cc/g) | Pore Size (P.S.) (Å) |
| 1 | 44.6 | 0.72 | 644 |
| 2 | 44.1 | 0.71 | 662 |

TABLE 1-continued

| | Silica particles | | |
|---|---|---|---|
| # | Surface Area (S.A) (m2/g) | Pore Volume (P.V.) (cc/g) | Pore Size (P.S.) (Å) |
| 3 | 44.1 | 0.70 | 657 |
| 4 | 43.4 | 0.70 | 663 |

In embodiments when the optional hydrating step has been completed the silica particle material can be further processed with a bonding step. The bonding step is carried out so as to ensure that the surface functionality of the particle material is such that ion exchange interactions and reverse phase interactions are prevented during the time that the sample interacts with the particle material within a separation column.

When the optional hydrating step is not performed, the silica particle material is also processed with a chemical surface modification step. This chemical surface modification step is carried out to ensure that the surface functionality of the particle material is such that ion exchange interactions and reverse phase interactions are prevented during the time that the sample interacts with the particle material within a separation column.

In one embodiment, the chemical surface modification step uses a hydrophilic silane compound as a reagent for conducting the chemical surface modification step on the silica particles. This hydrophilic silane has multiple —OH groups and results in the surface of the silica particle becoming similar to the water mobile phase, thereby reducing chemical interactions with the molecules contained within the sample. The silane chemical surface modification also ensures that the silanol groups remaining on the silica surface are sterically blocked and do not have an ion exchange interactions with the molecules of interest contained in the sample to be tested. The chemical surface modification steps in the present method are carried out simply in the presence of water, with the aid of an acidic catalyst. Prior silane chemical surface modification known in the art have been synthesized in toluene, however the inventors of the present disclosure have surprisingly discovered that this step can instead be carried out simply in an aqueous solution.

In an embodiment of the present disclosure the step of chemical surface modification of the porous particle material with a hydrophilic compound comprises:
a. preparing an aqueous bonding solution with controlled pH range;
b. adding the hydrophilic organosilane compound to the aqueous solution;
c. adding the porous particle material to the mixture of step b) and bonding hydrophilic organosilane compound with the surface of the porous particle material and obtaining a surface modified porous particle sorbent.

The hydrophilic compound added to the aqueous solution can be a very hydrophilic silane compound. In one particular embodiment, the hydrophilic silane compound is glycidoxypropyltrimethoxysilane (GTMPS) or diethoxy(3-glycidyloxypropyl)methylsilane. When GTMPS is added to the aqueous solution, this causes a hydrolysis of the GTMPS resulting in a hydrolysed GTMPS, which can more easily adsorb and react with the silica surface.

The porous particle material, i.e. the porous silica particles, are then added to the aqueous mixture containing the GTMPS and allowed to react for a period of about 12 hours at a temperature of about 100° C. During this reaction, the GTMPS is adsorbing on the surface of the silica particles, in a silylation reaction. The silylation of the silica surface by GTMPS significantly reduces the number of charged surface groups and silanol groups on the silica particles. GTMPS binds covalently to the silica surface and the epoxy ring on GTMPS opens and transforms into a diol (this can also be referred to a as diol bonded phase). The more GTMPS that is added to the aqueous solution, the higher degree of silylation that can occur, and hence the thicker the bonding on the surface of the silica particles. The thickness of the bonding can be analyzed base on % Carbon reading. This can be measured by an elemental analyzer. In some embodiments, the percentage Carbon value of the bonding is between 0.5-1.5% Carbon.

In one embodiment the step of bonding the porous particle material with a hydrophilic compound comprises combining the reaction solvents and reagents in the following specific amounts:

a. preparing 6× amount of DI water; mixing ⅓× amount of hydrophilic organosilane compound with DI water
b. adding the aqueous mixture to 1× amount of porous silica particles
c. adjusting pH of aqueous slurry mixture to 7 with 0.15× of 1N NaOH reacting the hydrophilic organosilane compound with 1× of the porous particle material, to obtain a surface modified porous particle material.

The value X here represents the amount porous particle material by weight. The following example illustrates in more detail the bonding procedure, such as chemical surface modification, that is performed on the porous particle material.

In some embodiments, the use of the porous particle material includes at least two columns in series, each column comprising a porous particle material. As describe herein the first or second column can be interchangeable so that the first column member and second column member are merely defining one of the two column members and not orientation or placement in the series. In a first column member one of the porous particle material having particles with an average diameter size in the range of about 2.8-3.2 µm. In one embodiment, the particle diameter is in the range of about 2.9-3.1 µm. In a further embodiment, the particle diameter is about 3.0 µm. In related embodiments, the average particle diameter is about 2.9 µm. In a further embodiment, the average particle diameter is about 3.0 µm. In an even further embodiment, the average particle diameter is about 3.1 µm.

In other related embodiments, the particle material comprises particles that have a porosity characterized by an initial pore volume in the range of 0.4 to 1.1 cc/g. In other embodiments, the initial pore volume is in the range of 0.6 to 1.0 cc/g, or any value therebetween. In further embodiments the initial pore volume is in the range of 0.7 to 0.9 cc/g, 0.8 to 0.9 cc/g, or any value therebetween.

In some related embodiments, the particle material comprises particles that have a porosity characterized by an initial pore size in the range of 500-800 Angstroms (Å). In other embodiments, the initial pore size is in the range of 550-750 Å, or any value therebetween. In further embodiments the initial pore size is in the range of 600-700 Å, or any value therebetween.

When the first step of the disclosed methods is carried out, the resulting particle material has a reduced porosity characterized by a final pore volume in the range of 0.5 to 1.0 cc/g, or any value therebetween. In some embodiments, the final pore volume can be reduced in the range of 0.6 to 0.9 cc/g, or any value there between.

After treatment of the particle martial, the final pore size have a porosity characterized by a final pore size in the range of 600 to 800 Angstroms (Å). In other embodiments, the final pore size is in the range of 650 to 750 Å, or any value therebetween. In further embodiments the final pore size is in the range of 630 to 680 Å, or any value there between.

The other porous particle material, which would be in a second column member comprising particles having an average diameter size in the range of about 1.0-3.0 µm. In one embodiment, the particle diameter is in the range of about 1.2-2.8 µm. In a further embodiment, the particle diameter is in the range of about 1.4-2.6 µm. In another embodiment, the particle diameter is in the range of about 1.6-2.4 µm. In a further embodiment, the particle diameter is in the range of about 1.8-2.2 µm. In an even further embodiment, the particle diameter is in the range of about 2.0-2.2 µm.

In some embodiments, the particle material comprises particles that have a porosity characterized by an initial pore volume in the range of 1.0-1.8 cc/g. In other embodiments, the initial pore volume is in the range of 1.1-1.7 cc/g, or any value therebetween. In further embodiments the initial pore volume is in the range of 1.2-1.6 cc/g, 1.3-1.5 cc/g, or any value there between.

During the production process of one of the porous particle material the resulting particle material has a reduced porosity characterized by a final pore volume in the range of 0.7 to 1.1 cc/g, or any value therebetween. In some embodiments, the final pore volume can be reduced in the range of 0.8 to 1.0 cc/g, or any value therebetween. This same porous particle material may also comprises a step of hydrating the particle material, which has already undergone a pore reduction thermal processing step. The step of hydrating the particle material is carried out so as to reintroduce functionality to the surface of the particle material, for further chemical bonding during the subsequent coating step. Once the hydrating step has been completed the silica particle material can be processed with a coating step. The coating step is carried out so as to ensure that the surface functionality of the particle material is such that ion exchange interactions and reverse phase interactions are prevented during the time that the sample interacts with the particle material within a separation column.

As can be appreciated the system that comprise at least two column members in series, where each of the column members comprises a porous particle material, can allow for improved separation efficiency. While it can be appreciated that separation efficiency of SEC column increases as the length of column increases. However, under the current system described herein that ability to get high resolution separation efficiency can be fine-tuned depending on the test sample by connecting multiple column members in series.

EXAMPLES

In one example, 6× of deionized water is placed in a reactor, and the reactor temperature can be optionally set to 25 C, although the temperature elevation is not required. In embodiments, where temperature is desired, once the temperature is stabilized and reading in the range of 25-30° C., ⅓× by volume of GTMPS is added to the reactor. The resulting mixture is stirred and the temperature is monitored. There will be a momentary temperature rise (in the range of 1.5-4° C.) due to exothermic reactions occurring. The mixture turns opaque, but becomes clear after about 10 minutes. Once the mixture is clear 30 grams of silica particles are added. The pH of the aqueous slurry is measured and adjusted with about 0.15× of 1N NaOH to about 6.75-7.25. The temperature set point of the reactor is set to 100° C., with a ramp up function of 50° C. per hour, and the reaction is allowed to proceed for a period of about 12 hours. The silica particles used in this example are 3.0 µm sized particles that have previously undergone hydration process. Once the reaction has completed, the silica particles undergo a washing step, using filter paper and a Buchner funnel. 6× amount of methanol is used to wash the silica particles. The silica particles are then allowed to dry in an 80° C. environment for a period of 8 hours. Subsequently an Elemental Analyzer is used to measure the % Carbon of the bonded silica particles, so that the silane chemical surface modification on the particles can be quantified. It should be appreciated that the amount of silica used is dependent on final amount of the porous particle material desired.

In another example method, 6× of deionized water is placed in a reactor, and the reactor temperature is set to 25 C. Once the temperature is stabilized and reading in the range of 25-30° C., ⅓× by volume of GTMPS is added to the reactor. The resulting mixture is stirred and the temperature is monitored. There will be a momentary temperature rise (in the range of 1.5-4° C.) due to exothermic reactions occurring. The mixture turns opaque, but becomes clear after about 10 minutes. Once the mixture is clear, a predetermined amount of silica particles is added, for example 30 g for small batch manufacturing or 300 g for full scale production. The pH of the aqueous slurry is measured. The pH reading is close to a pH value of between 2-9, preferably between 4-8, and more preferably adjusted with 0.15× of 1N NaOH to about 6.75-7.25. The temperature set point of the reactor is set to 100° C., with a ramp up function of 50° C. per hour, and the reaction is allowed to proceed for a period of about 12 hours. The silica particles used in this example have an initial pore volume of between 0.4 cc/g to 1.1 cc/g, preferably between 0.7 cc/g to 0.9 cc/g. Once the reaction has completed, the silica particles undergo a washing step, using filter paper and a Buchner funnel. 10× amount of deionized water is used to wash the silica particles, followed by 5× amount of methanol. The silica particles are then allowed to dry in an 80° C. environment for a period of about 8 hours. Subsequently an Elemental Analyzer is used to measure the % Carbon of the bonded silica particles, so that the silane chemical surface modification on the particles can be quantified.

After the chemical surface modification step is completed, the resultant particles are now silane coated silica particles with diol surface modifications, that allow for a reduction in ion exchange and reverse phase interactions with the molecules in the samples to be tested. The surface modifications that occur due to the silane chemical surface modification make the silica particles have a surface functionality similar to water, hence making the packing materials surface chemistry similar to the mobile phase chemistry. Thus any interactions that occur between the sample and the packing materials are now solely due to size exclusion principles and are not altered by non-size dependent factors and interactions, such as adsorption of the molecule with reactive silanol groups on the surface of the particles. Because the silica particles are now diol modified surfaces, or diol bonded phase particles, they no longer have negatively charged silanol groups on the surface, that can interfere with the retention times of the analytes of interest. The diol ligand covers the silica surfaces as well as displays a polar functionality that mimics water, thereby rendering the surface of the silica particles similar to the aqueous mobile phase that are carrying the analyte/molecules past and through the stationary phase packing material.

The present disclosure further relates to chromatographic separation devices, particularly SEC devices, wherein the packing material used therein contains the porous particle materials, disclosed as part of this invention. These porous packing materials have a pore volume, which provides an increased mechanical stability and longer lifetime to the separation device, and they further have and chemical surface modification thereon yielding the surface modified particle material with decreased interactions with the analytes of interest. In some embodiments the surface modified porous particle material comprises a chemical surface modification having a ligand density of between 2.5-4.5 umol/m$^2$.

The chromatographic separation devices disclosed herein are particularly useful in the analysis of monoclonal antibodies, biosimilars, and other biomolecules.

In one embodiment, a chromatographic separation device is disclosed, which comprises:
 at least one columnar member having an inner void;
 at least one stationary packing material within the inner void;
wherein the stationary packing material comprises a pore volume and surface modified particle material, according to the methods disclosed herein.

In certain embodiments, the stationary packing material comprises silica particles, having an average pore volume of about 0.5 to 1.2 cc/g. In another embodiment, the silica particles have an average pore volume of about 0.6 to 1.1 cc/g. In a further embodiment, the silica particles have an average pore volume of about 0.6 cc/g to 0.9 cc/g.

In some embodiments, the chromatographic separation device is an SEC device or a Gel Filtration Chromatography device (GFC). GFC is used to separate large macromolecules such as antibodies, immunoglobulins, protein complexes, protein aggregates, peptides, and other biomolecules. In gel filtration chromatography, the compounds of interest in the sample move and filter through the stationary phase based on their molecular size. Typically aqueous solvents are used in the mobile phase to ensure that the compound of interest maintains biological integrity. Gel filtration columns can separate biomolecules that range in size. Gel filtration chromatography columns require a GFC stationary packing material that has low surface activity, high efficiency, and consistent uniform pore size. In some example embodiments, the SEC column can separate out biomolecules in the range of 10 to 4000 kD. In other related embodiments the SEC column can separate out biomolecules in the range of 100 to 3000 kD. In other related embodiments the SEC column can separate out biomolecules in the range of 200 to 2000 kD. In other related embodiments the SEC column can separate out biomolecules in the range of 300 to 1,500 kD. In other related embodiments the SEC column can separate out biomolecules in the range of 1,000 to 3,000 kD.

In some embodiments, the columnar member of the chromatographic separation device has length of about 100 mm, about 150 mm, or about 300 mm.

The columnar member has an inner void with an inner diameter of about 1 mm, about 1.5 mm, about 2.1 mm, about 4.6 mm, about 7.8 mm, or about 10 mm wherein the porous packing material of the present disclosure is housed. The particle size for the stationary packing material housed in the columnar member can vary between 1.6-3.0 µm. In some embodiments, the average particle size of the packing material is greater than 1.8 µm, and in other embodiments a packing material having a 3.0 µm particle size is used. This will depend on the type of analyte to be tested, and the size of the molecules of interest, in addition to the column size parameters. As disclosed above, the porous packing material within the columnar member of the separation device has a reduced pore volume, which results in increased stability of the packing material and increased lifetime of the columnar member of the chromatographic separation devices disclosed herein.

In at least one example embodiment, a chromatographic separation device for molecules comprises at least one columnar member having an inner void; and at least one stationary phase packing material within the inner void. In at least this example embodiment the stationary phase packing material comprises a porous particle material, wherein the porous particle material comprises silica particles having an average final pore size of about 600 to 800 Å, preferably 650 to 750 Å, more preferably 630 to 680 Å.

In related embodiments the chromatographic separation device comprises porous particle material is packed into a column having a diameter of about 4.6 mm with a flow rate of 0.35 mL/min, with a resolution Rs of AAVs monomer/aggregate of >1.2. In other related embodiments the when the porous particle material is packed into a column having a diameter of about 7.8 mm with a flow rate of 1.0 mL/min the chromatographic separation device has a resolution Rs of AAVs monomer/aggregate >1.2. In another related embodiment, the chromatographic separation device comprises porous particle material that is packed into a column having a diameter of about 4.6 mm with a flow rate of 0.35 mL/min, where the chromatographic separation device has a molecule recovery of >90%. In another related embodiment, the chromatographic separation device comprises porous particle material that is packed into a column having a diameter of about 7.8 mm with a flow rate of 0.35 mL/min, where the chromatographic separation device has a molecule recovery of >90%.

Referring now to FIG. 1, where a chromatogram of AAV2 is shown comparing the porous packing material in a chromatographic separation device having a 4.6 mm column diameter (dashed line) and 7.8 mm column diameter (dash dot line) compared to other separation column. These comparative columns are indicated with (1) dash dot dot dash; (2) short dash, long dash; and (3) solid line respectively. Each of the comparative columns used had a 7.8 mm diameter. Sample runs as were, performed at 0.35 mL/min and 0.45 mL/min, and with varied column pressures, as shown by the Y-axis. As shown, the flow rate and pressure conditions shown in the graph, remained steady. These results signify a high level of stability of the packing materials and a high degree of reliability of results over hundreds of runs. When compared to comparative SEC columns (Comparative Column 1, Comparative Column 2 and Comparative Column 3), the SEC devices designed and operated with the packing materials disclosed herein (Experimental Column 1 and Experimental Column 2) show a high degree of superiority in terms of column stability and resolution when separating AAVs from aggregates.

TABLE 2

AAV2

| | Peak | Retention Time | Area | % Area | Height | K Prime | Selectivity | USP Resolution | USP Resolution (HH) | USP Plate Count | Width @ 50% |
|---|---|---|---|---|---|---|---|---|---|---|---|
| Exp. Column 1 | AAV high MW | 3.608 | 152386 | 7.55 | 11356 | 6.22 | | | | | |
| | AAV monomer | 4.175 | 1866424 | 92.45 | 162692 | 7.35 | 1.18 | N/A | N/A | 3774 | 0.16 |
| Exp. Column 2 | AAV high MW | 7.204 | 143082 | 5.48 | 8902 | 13.41 | | | | 6314 | 0.26 |
| | AAV monomer | 8.323 | 2469029 | 94.52 | 152881 | 15.65 | 1.17 | 2.58 | 2.72 | 7418 | 0.23 |
| Comparative Column 3 | AAV high MW | 8.355 | 132709 | 5.26 | 6972 | 15.71 | | | | | |
| | AAV monomer | 9.273 | 2391177 | 94.74 | 115516 | 17.55 | 1.12 | N/A | N/A | 5431 | 0.29 |
| Comparative Column 4 | AAV high MW | 6.679 | 174560 | 6.6 | 5772 | 12.36 | | | | | |
| | AAV monomer | 7.612 | 2469825 | 93.4 | 50100 | 14.22 | 1.15 | N/A | N/A | 569 | 0.74 |
| Comparative Column 5 | AAV high MW | 6.36 | 104890 | 4.96 | 4977 | 11.72 | | | | 569 | |
| | AAV monomer | 7.384 | 2010657 | 95.04 | 69504 | 13.77 | 1.17 | N/A | N/A | 1867 | 0.40 |

Analysis from FIG. 1 is shown in Table 2, where comparative data between the two experimental columns 1 and 2 is compared to the comparative examples 1, 2 and 3 running AAV2 as the test sample. Table 2 shows marked differences between the Experimental columns 1 and 2 analyzing AAV high molecular weight sample and AAV monomer.

Figure 2:
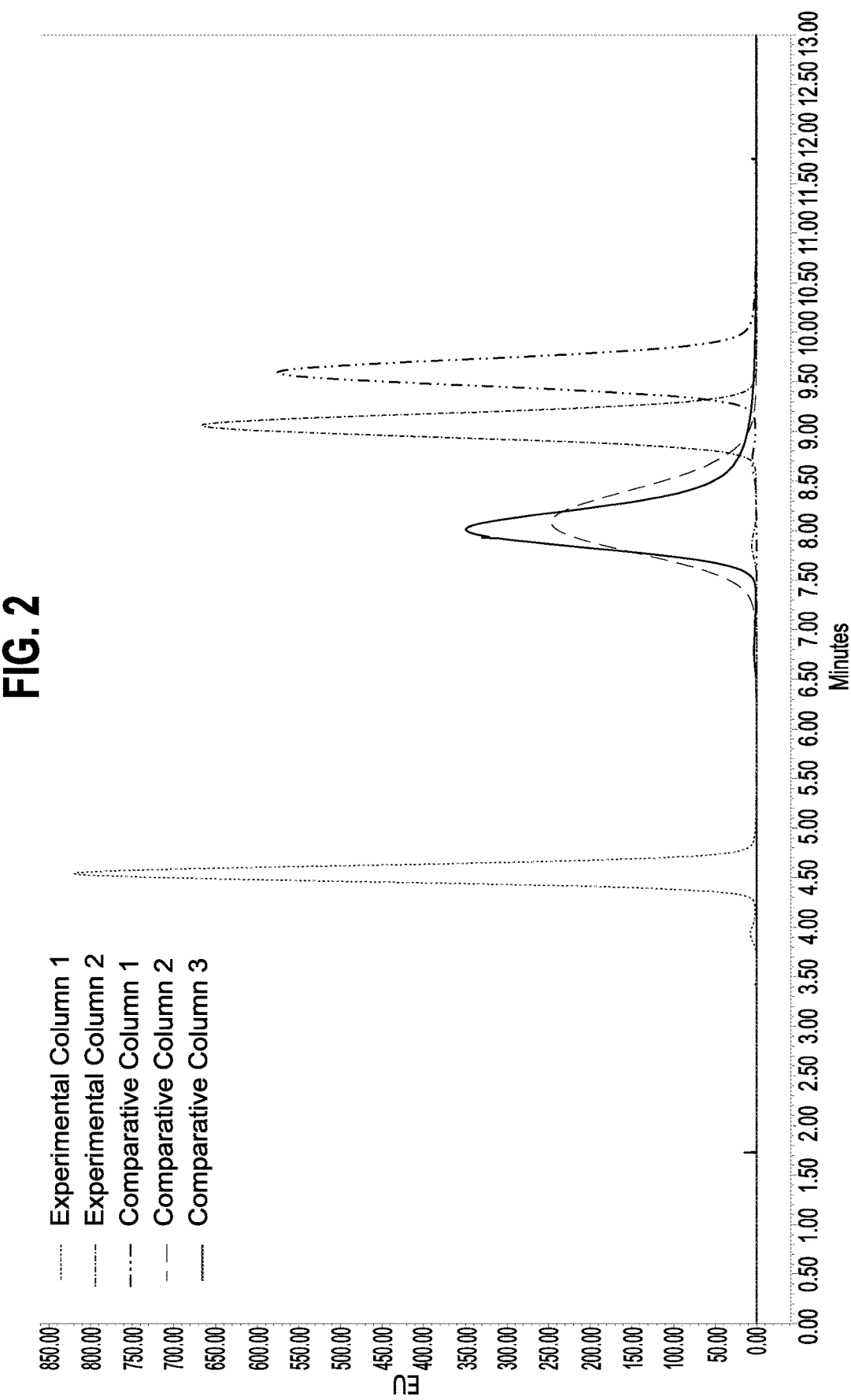
FIG. 2 depicts chromatograms showing AAV5 separation using various embodiments of the invention compared to alternative SEC columns.

Moving now to the FIG. 2, where a chromatogram of AAV5 is shown comparing the porous packing material in a chromatographic separation device having a 4.6 mm column diameter (dashed line) and 7.8 mm column diameter (dash dot line) compared to other separation column. These comparative columns are indicated with (1) dash dot dot dash; (2) short dash, long dash; and (3) solid line respectively. Each of the comparative columns used had a 7.8 mm diameter. Sample runs as were, performed at 0.35 mL/min and 0.45 mL/min, and with varied column pressures, as shown by the Y-axis. As shown, the flow rate and pressure conditions shown in the graph, remained steady. These results signify a high level of stability of the packing materials and a high degree of reliability of results over hundreds of runs. When compared to competitor SEC columns (Comparative Columns 1, 2 and 3), the SEC devices designed and operated with the packing materials disclosed herein (Experimental Column 1 and 2) show a high degree of superiority in terms of column stability and resolution when separating AAVs from aggregates.

TABLE 3

AAV5

| | Peak | Retention Time | Area | % Area | Height | K Prime | Selectivity | USP Resolution | USP Resolution (HH) | USP Plate Count | Width @ 50% |
|---|---|---|---|---|---|---|---|---|---|---|---|
| Exp. Column 1 | AAV high MW | 3.945 | 1140004 | 1.15 | 76837 | 6.89 | | | | 1899 | 0.21 |
| | AAV monomer | 4.539 | 98107734 | 98.85 | 8195714 | 8.08 | 1.17 | 1.71 | 1.77 | 3358 | 0.18 |
| Exp. Column 2 | AAV high MW | 7.857 | 1221913 | 1.05 | 60244 | 14.71 | | | | 3715 | 0.3 |
| | AAV monomer | 9.063 | 115673522 | 98.95 | 6656464 | 17.13 | 1.16 | 2.46 | 2.52 | 6323 | 0.27 |
| Comparative Column 3 | AAV high MW | 8.692 | 1244255 | 1.06 | 53436 | 16.38 | | | | 3263 | 0.35 |
| | AAV monomer | 9.596 | 116291432 | 98.94 | 5752410 | 18.19 | 1.11 | 1.5 | 1.62 | 5363 | 0.31 |
| Comparative Column 4 | AAV high MW | 6.975 | 845435 | 0.71 | 25471 | 12.95 | | | | | |
| | AAV monomer | 8.086 | 118577272 | 99.29 | 2466877 | 15.17 | 1.17 | N/A | N/A | 654 | 0.74 |
| Comparative Column 5 | AAV high MW | 6.78 | 1077681 | 0.96 | 32366 | 12.56 | | | | 1034 | 0.47 |
| | AAV monomer | 8.009 | 111536650 | 99.04 | 3492408 | 15.02 | 1.20 | 1.42 | 1.57 | 1685 | 0.45 |

Analysis from FIG. 2 is shown in Table 3, where comparative data between the two experimental columns 1 and 2 is compared to the comparative examples 1, 2 and 3 running AAV5 as the test sample. Table 3 shows marked differences between the Experimental columns 1 and 2 analyzing AAV high molecular weight sample and AAV monomer.

Figure 3:
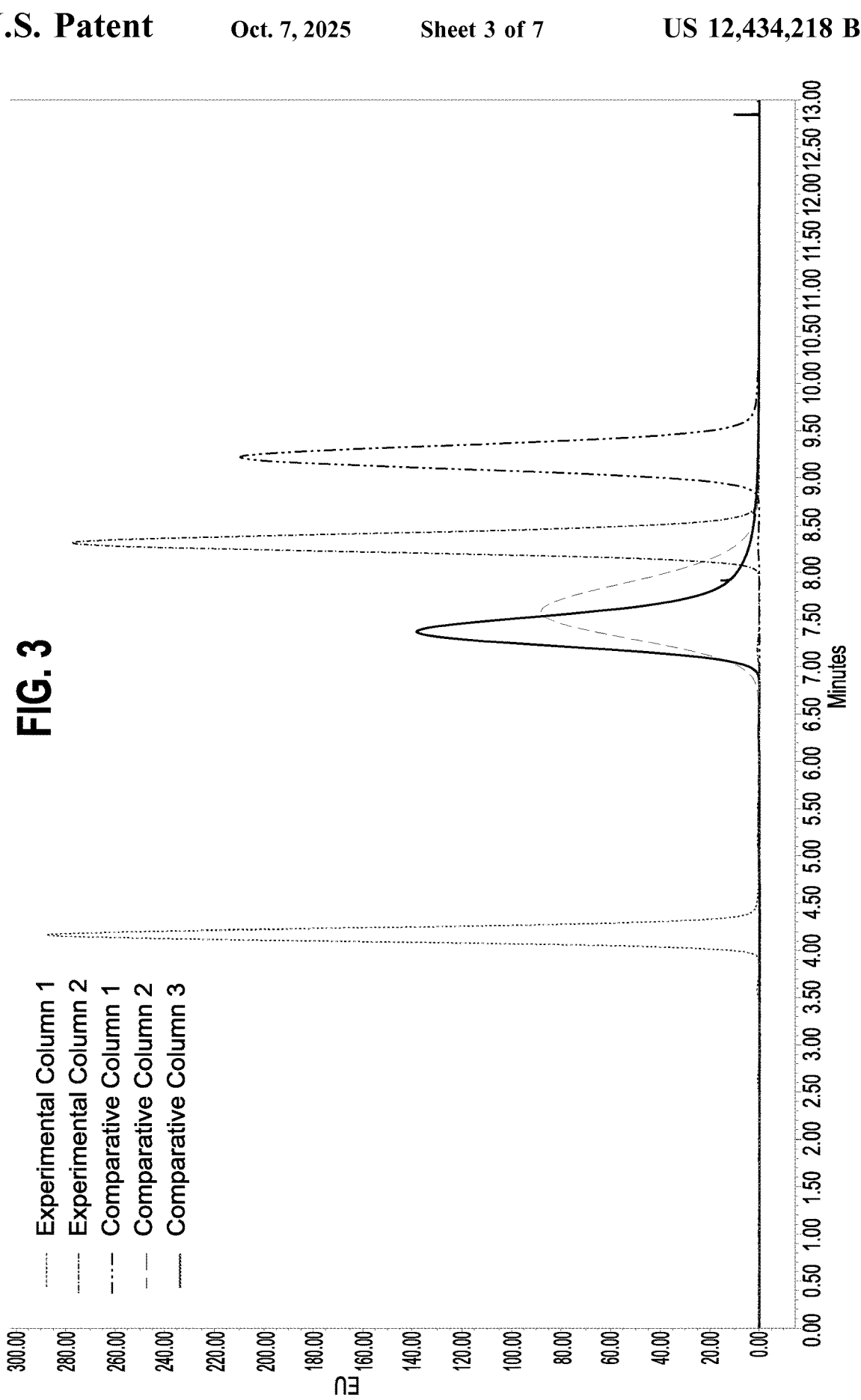
FIG. 3 depicts chromatograms showing AAV8 separation using various embodiments of the invention compared to alternative SEC columns.

Moving now to the FIG. 3, where a chromatogram of AAV8 is shown comparing the porous packing material in a chromatographic separation device having a 4.6 mm column diameter (dashed line) and 7.8 mm column diameter (dash dot line) compared to other separation column. These comparative columns are indicated with (1) dash dot dot dash; (2) short dash, long dash; and (3) solid line respectively. Each of the comparative columns used had a 7.8 mm diameter. Sample runs as were, performed at 0.35 mL/min and 0.45 mL/min, and with varied column pressures, as shown by the Y-axis. As shown, the flow rate and pressure conditions shown in the graph, remained steady. These results signify a high level of stability of the packing materials and a high degree of reliability of results over hundreds of runs. When compared to competitor SEC columns (Comparative Columns 1, 2 and 3), the SEC devices designed and operated with the packing materials disclosed herein (Experimental Column 1 and 2) show a high degree of superiority in terms of column stability and resolution when separating AAVs from aggregates.

TABLE 4

AAV8

| | Peak | Retention Time | Area | % Area | Height | K Prime | Selectivity | USP Resolution | USP Resolution (HH) | USP Plate Count | Width @ 50% |
|---|---|---|---|---|---|---|---|---|---|---|---|
| Exp. Column 1 | AAV high MW | 3.588 | 93667 | 0.32 | 8081 | 6.18 | | | | 2012 | 0.18 |
| | AAV monomer | 4.165 | 28942985 | 99.68 | 2878779 | 7.33 | 1.19 | 2.13 | 2.05 | 3989 | 0.15 |

TABLE 4-continued

AAV8

|  | Peak | Retention Time | Area | % Area | Height | K Prime | Selectivity | USP Resolution | USP Resolution (HH) | USP Plate Count | Width @ 50% |
|---|---|---|---|---|---|---|---|---|---|---|---|
| Exp. Column 2 | AAV high MW | 7.181 | 126344 | 0.32 | 7369 | 13.36 |  |  |  | 4842 | 0.24 |
|  | AAV monomer | 8.312 | 39002942 | 99.68 | 2775105 | 15.62 | 1.17 | 2.88 | 2.90 | 8098 | 0.22 |
| Comparative Column 3 | AAV high MW | 8.301 | 115953 | 0.29 | 5991 | 15.6 |  |  |  | 2878 | 0.3 |
|  | AAV monomer | 9.219 | 39381606 | 99.71 | 2096089 | 17.44 | 1.12 | 1.69 | 1.86 | 5720 | 0.29 |
| Comparative Column 4 | AAV high MW | 5.39 | 170763 | 0.43 | 6994 | 9.78 |  |  |  | 1653 | 0.37 |
|  | AAV monomer | 7.582 | 39603062 | 99.57 | 881390 | 14.16 | 1.45 | 2.38 | 2.43 | 653 | 0.69 |
| Comparative Column 5 | AAV high MW | 6.293 | 81348 | 0.22 | 4304 | 11.59 |  |  |  | 5289 | 0.30 |
|  | AAV monomer | 7.375 | 37742644 | 99.78 | 1383431 | 13.7 | 1.19 | 1.81 | 1.88 | 2010 | 0.38 |

Analysis from FIG. 3 is shown in Table 4, where comparative data between the two experimental columns 1 and 2 is compared to the comparative examples 1, 2 and 3 running AAV8 as the test sample. Table 4 shows marked differences between the Experimental columns 1 and 2 analyzing AAV high molecular weight sample and AAV monomer.

Figure 4:
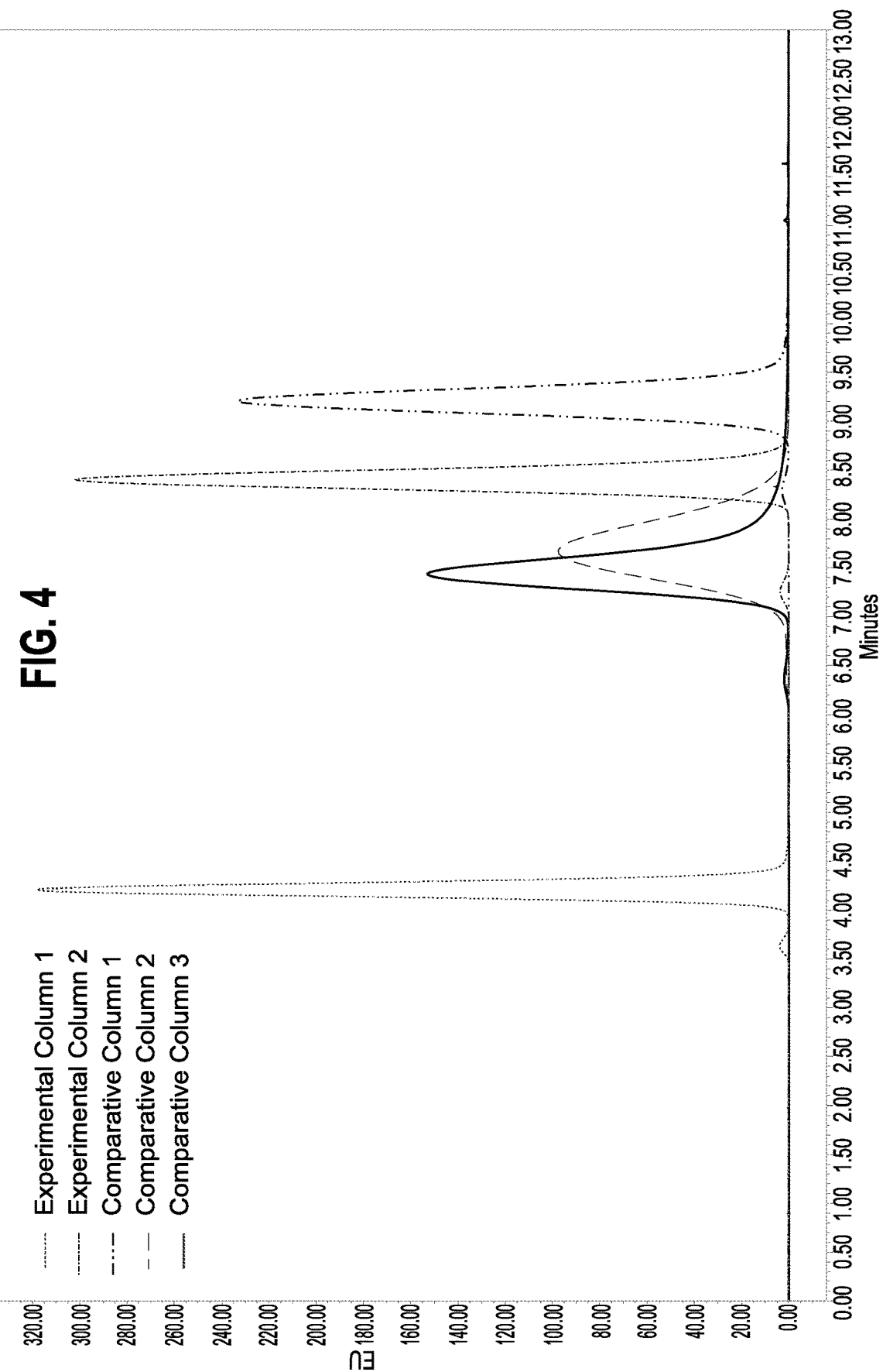
FIG. 4 depicts chromatograms showing AAV9 separation using various embodiments of the invention compared to alternative SEC columns.
Figure 5A:
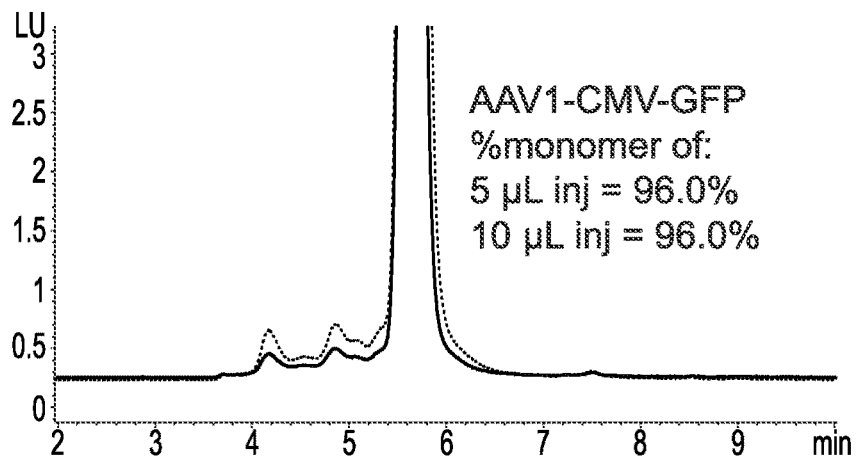
FIG. 5A-H depicts chromatograms showing AAV separation using embodiments of the invention.
Figure 5B:
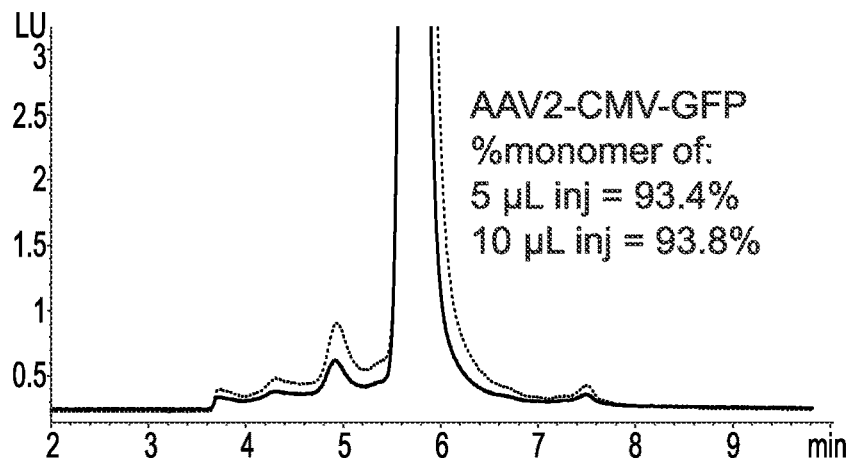
Figure 5C:
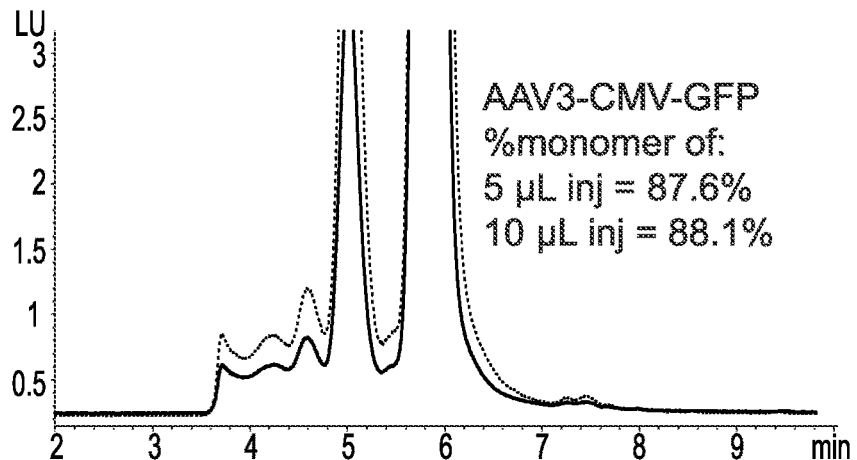
Figure 5D:
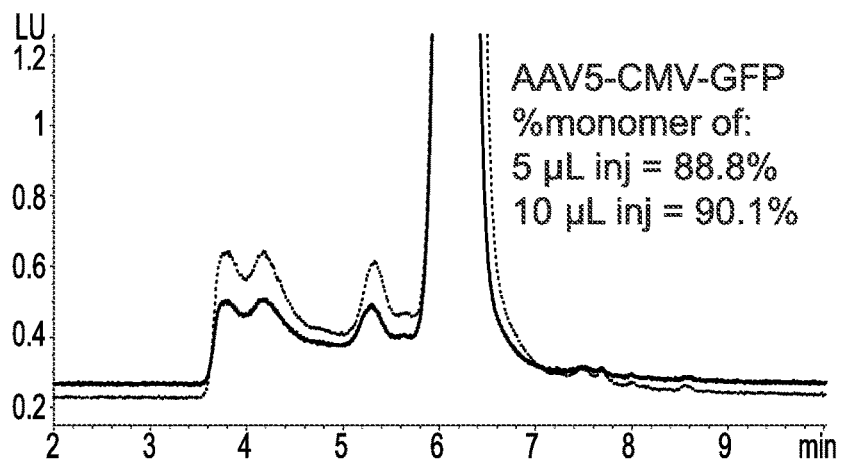
Figure 5E:
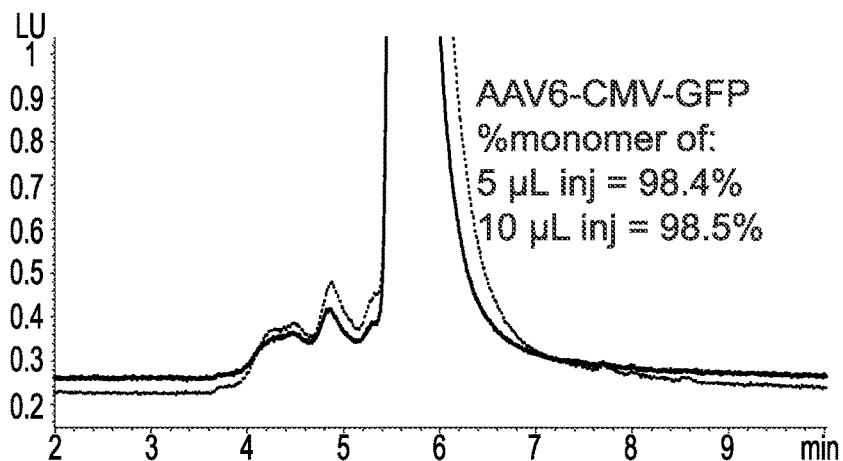
Figure 5F:
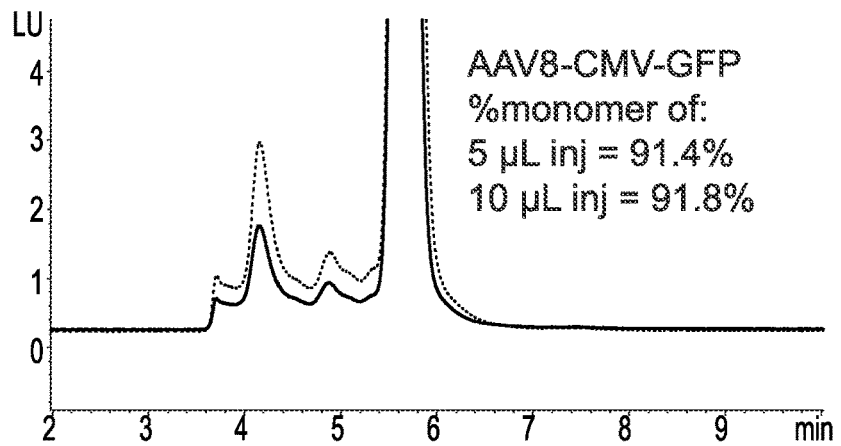
Figure 5G:
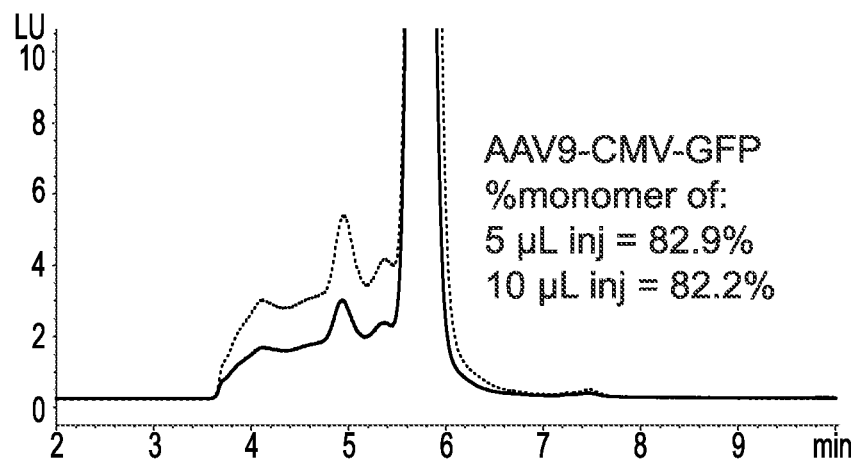
Figure 5H:
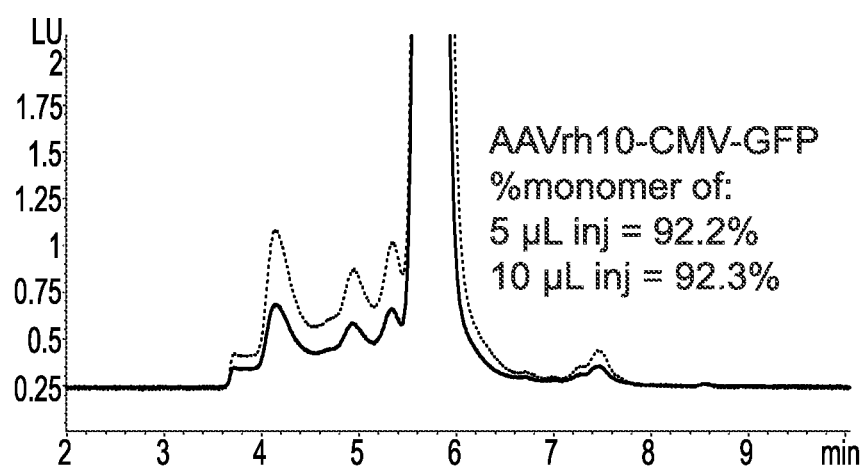

Referring now to the FIG. 4, where a chromatogram of AAV9 is shown comparing the porous packing material in a chromatographic separation device having a 4.6 mm column diameter (dashed line) and 7.8 mm column diameter (dash dot line) compared to other separation column. These comparative columns are indicated with (1) dash dot dot dash; (2) short dash, long dash; and (3) solid line respectively.

Each of the comparative columns used had a 7.8 mm diameter. Sample runs as were, performed at 0.35 mL/min and 0.45 mL/min, and with varied column pressures, as shown by the Y-axis. As shown, the flow rate and pressure conditions shown in the graph, remained steady. These results signify a high level of stability of the packing materials and a high degree of reliability of results over hundreds of runs. When compared to competitor SEC columns (Comparative Columns 1, 2 and 3), the SEC devices designed and operated with the packing materials disclosed herein (Experimental Column 1 and 2) show a high degree of superiority in terms of column stability and resolution when separating AAVs from aggregates.

TABLE 5

AAV9

|  | Peak | Retention Time | Area | % Area | Height | K Prime | Selectivity | USP Resolution | USP Resolution (HH) | USP Plate Count | Width @ 50% |
|---|---|---|---|---|---|---|---|---|---|---|---|
| Exp. Column 1 | AAV high MW | 3.64 | 435594 | 1.32 | 39666 | 6.28 |  |  |  | 2552 | 0.17 |
|  | AAV monomer | 4.208 | 32586305 | 98.68 | 3182793 | 7.42 | 1.18 | 1.99 | 2.07 | 3936 | 0.16 |
| Exp. Column 2 | AAV high MW | 7.261 | 571644 | 1.3 | 37242 | 13.52 |  |  |  | 4915 | 0.24 |
|  | AAV monomer | 8.403 | 43421318 | 98.7 | 3016075 | 15.81 | 1.17 | 2.9 | 2.92 | 7852 | 0.22 |
| Comparative Column 3 | AAV high MW | 8.296 | 551545 | 1.25 | 28290 | 15.59 |  |  |  | 4083 | 0.30 |
|  | AAV monomer | 9.204 | 43422111 | 98.75 | 2331095 | 17.41 | 1.12 | 1.80 | 1.83 | 5768 | 0.28 |
| Comparative Column 4 | AAV high MW | 6.516 | 381089 | 0.86 | 12584 | 12.03 |  |  |  |  |  |
|  | AAV monomer | 7.674 | 43737982 | 99.14 | 975884 | 14.35 | 1.19 | N/A | N/A | 673 | 0.69 |

TABLE 5-continued

AAV9

|  | Peak | Retention Time | Area | % Area | Height | K Prime | Selectivity | USP Resolution | USP Resolution (HH) | USP Plate Count | Width @ 50% |
|---|---|---|---|---|---|---|---|---|---|---|---|
| Comparative Column 5 | AAV high MW | 6.349 | 479829 | 1.12 | 20059 | 11.7 |  |  |  | 1532 | 0.36 |
|  | AAV monomer | 7.439 | 42457637 | 98.88 | 1529624 | 13.88 | 1.19 | 1.62 | 1.73 | 1993 | 0.39 |

Analysis from FIG. 4 is shown in Table 5, where comparative data between the two experimental columns 1 and 2 is compared to the comparative examples 1, 2 and 3 running AAV9 as the test sample. Table 5 shows marked differences between the Experimental columns 1 and 2 analyzing AAV high molecular weight sample and AAV monomer.

Referring now to FIG. 5A-H, where a variety of serotypes were analyzed. The column can be used to look at capsid differences. AAVs 1, 2, 3, 5, 6, 8, 9, rh10 were run and the RT of the monomer are shown in Table 6. The greatest Retention Time (RT) difference is observed for AAV1 and AAV5. Although a smaller difference was noted between for comparisons between AAVs, such as AAV1 and AAV6, these serotypes samples only differ by a couple of amino acids in their capsid structures. Additionally, RT can be used to identify empty vs full AAVs. Using the porous particle material described herein, these small RT shifts, are highly reproducible and can be used for identification purposes as well, given the specificity of the porous particle material used in the column.

TABLE 6

Monomer Peak Retention Time for Serotype Observed on the SEC Column.

| Serotype | Retention Time(min) |
|---|---|
| AAV1-CMV-GFP (FIG. 5A) | 5.633 |
| AAV6-CMV-GFP (FIG. 5E) | 5.651 |
| AAV8-CMV-GFP (FIG. 5F) | 5.655 |
| AAV2-CMV-GFP (FIG. 5B) | 5.708 |
| AAVrh10-CMV-GFP (FIG. 5H) | 5.722 |
| AAV9-CMV-GFP (FIG. 5G) | 5.737 |
| AAV3-CMV-GFP (FIG. 5C) | 5.827 |
| AAV4-CMV-GFP | 6.008 |
| AAV5-CMV-GFP (FIG. 5D) | 6.190 |

Although the present disclosure has been described with respect to one or more particular embodiments, it will be understood that other embodiments of the present disclosure may be made without departing from the scope of the present disclosure. Hence the present disclosure is deemed limited only by the appended claims.

Further examples and embodiments of the present disclosure are disclosed in the enumerated clauses which follow:

1. A chromatographic separation device for molecules comprising:
   at least one columnar member having an inner void;
   at least one stationary phase packing material within the inner void;
   wherein the stationary phase packing material comprises a surface modified porous particle material.

2. The chromatographic separation device of clause 1, wherein the chromatographic separation device is size exclusion chromatographic device.

3. The chromatographic separation device of any one of clauses 1-2, wherein the surface modified porous particle material comprises silica particles.

4. The chromatographic separation device of any one of clauses 1-3, wherein the surface modified porous particle material comprises a chemical surface modification having 0.5-1.5% carbon.

5. The chromatographic separation device of any one of clauses 1-4, wherein the surface modified porous particle material comprises a chemical surface modification having a diol bonded phase.

6. The chromatographic separation device of any one of clauses 1-5, wherein the surface modified porous particle material comprises a chemical surface modification having ligand density of between 2.5-4.5 µmol/m$^2$.

7. The chromatographic separation device of any one of clauses 1-6, wherein the porous particle material comprises silica particles having a final pore volume of 0.50-1.00 cc/g.

8. The chromatographic separation device of any one of clauses 1-6, wherein the porous particle material comprises silica particles having a final pore volume of 0.6-0.8 cc/g.

9. The chromatographic separation device of any one of clauses 1-8, wherein the porous particle material comprises silica particles having an average particle size of 3.0 µm.

10. The chromatographic separation device of any one of clauses 1-9, wherein the porous particle material comprises silica particles having an average initial pore size of about 500 to 800 Å.

11. The chromatographic separation device of any one of clauses 1-9, wherein the porous particle material comprises silica particles having an average final pore size of about 600 to 700 Å.

12. The chromatographic separation device of any one of clauses 1-11, wherein the at least one columnar member has a length of 100 mm, 150 mm or 300 mm.

13. The chromatographic separation device of any one of clauses 1-12, wherein the inner void of the at least one columnar member has a diameter between 1 mm-10 mm mm.

14. The chromatographic separation device of any one of clauses 1-13, wherein the molecules are selected from a group comprising: adeno-associated virus (AAV), monoclonal antibodies, immunoglobulins, protein complexes, protein aggregates, parvovirus, peptides, biomolecules, or a combination thereof.

15. A chromatographic separation device for molecules comprising:
   at least one columnar member having an inner void;
   at least one stationary phase packing material within the inner void;
   wherein the stationary phase packing material comprises a porous particle material, wherein the porous particle material comprises silica particles having an average final pore size of about 600 to 700 Å.

16. The chromatographic separation device of clause 15, wherein when the porous particle material is packed into a column having a diameter of about 4.6 mm with a flow rate of 0.35 mL/min the chromatographic separation device has a resolution Rs of AAVs monomer/aggregate >1.2.

17. The chromatographic separation device of clause 15, wherein when the porous particle material is packed into a column having a diameter of about 7.8 mm with a flow rate of 1.0 mL/min the chromatographic separation device has a resolution Rs of AAVs monomer/aggregate >1.2.

18. The chromatographic separation device of any one of clauses 15-16, wherein when the porous particle material is packed into a column having a diameter of about 4.6 mm with a flow rate of 0.35 mL/min the chromatographic separation device has a molecule recovery of >90%.

19. The chromatographic separation device of any one of clauses 15 or 17, wherein when the porous particle material is packed into a column having a diameter of about 7.8 mm with a flow rate of 1.0 mL/min the chromatographic separation device has a molecule recovery of >90%.

20. A material for use in a chromatographic separation device comprising:
at least one stationary phase packing material, wherein the stationary phase packing material comprises a surface modified porous particle material.

21. The material for use in a chromatographic separation device of clause 20, wherein the surface modified porous particle material comprises silica particles.

22. The material for use in a chromatographic separation device of any one of clauses 20-21, wherein the surface modified porous particle material comprises a chemical surface modification having 0.8-1.2% carbon.

23. The material for use in a chromatographic separation device of any one of clauses 20-22, wherein the surface modified porous particle material comprises a chemical surface modification having a diol bonded phase.

24. The material for use in a chromatographic separation device of any one of clauses 20-23, wherein the surface modified porous particle material comprises a chemical surface modification having ligand density of between 2.5-4.5 µmol/m$^2$.

25. The material for use in a chromatographic separation device of any one of clauses 20-24, wherein the porous particle material comprises silica particles having a final pore volume of 0.50-1.00 cc/g.

26. The material for use in a chromatographic separation device of any one of clauses 20-25, wherein the porous particle material comprises silica particles having a final pore volume of 0.7-0.9 cc/g.

27. The material for use in a chromatographic separation device of any one of clauses 20-26, wherein the porous particle material comprises silica particles having an average particle size of 3.0 µm.

28. The material for use in a chromatographic separation device of any one of clauses 20-27, wherein the porous particle material comprises silica particles having an average initial pore size of about 500 to 800 Å.

29. The material for use in a chromatographic separation device of any one of clauses 20-28, wherein the porous particle material comprises silica particles having an average final pore size of about 600 to 700 Å.

30. The material for use in a chromatographic separation device of any one of clauses 20-28, wherein the porous particle material comprises silica particles having an average final pore size of about 650 to 750 Å.

31. The material for use in a chromatographic separation device of any one of clauses 20-28, wherein the porous particle material comprises silica particles having an average final pore size of about 630 to 680 Å.

32. The material for use in a chromatographic separation device of any one of clauses 20-31, wherein the material is capable of separation of a molecule, wherein the molecules are selected from a group comprising: adeno-associated virus (AAV), monoclonal antibodies, immunoglobulins, protein complexes, protein aggregates, parvovirus, peptides, biomolecules, and combination thereof.

33. The material for use in a chromatographic separation device of any one of clauses 20-32, wherein the particle material can be comprised of particles having an average diameter size in the range of about 1.0-10 µm, or about 1.2-8.0 µm, or about 1.4-7.0 µm, or about 1.6-6.0 µm, or about 1.8-4.5 µm, or about 2.5-3.5 µm.

34. The material for use in a chromatographic separation device of any one of clauses 20-33, wherein when the material is packed into a separation column having a columnar diameter of 4.6 mm with a 0.35 mL/min run rate will separate out a molecule with a USP Half Height of at or above 1.7 or 2.0 or 2.1.

35. The material for use in a chromatographic separation device of any one of clauses 20-34, wherein when the material is packed into a separation column having a columnar diameter of 7.8 mm with a 1.0 mL/min run rate will separate out a molecule with a USP Half Height of at or above 1.7 or 2.0 or 2.5.

36. The material for use in a chromatographic separation device of any one of clauses 20-35, wherein the particle material comprises particles having an average diameter size in the range of about 1.0-10 µm.

37. The material for use in a chromatographic separation device of any one of clauses 20-35, wherein the particle material comprises particles having an average diameter size in the range of about 1.2-8.0 µm.

38. The material for use in a chromatographic separation device of any one of clauses 20-35, wherein the particle material comprises particles having an average diameter size in the range of about 1.4-7.0 µm.

39. The material for use in a chromatographic separation device of any one of clauses 20-35, wherein the particle material comprises particles having an average diameter size in the range of about 1.6-6.0 µm.

40. The material for use in a chromatographic separation device of any one of clauses 20-35, wherein the particle material comprises particles having an average diameter size in the range of about 1.8-4.5 µm.

41. The material for use in a chromatographic separation device of any one of clauses 20-35, wherein the particle material comprises particles having an average diameter size in the range of about 2.5-3.5 µm.

42. The material for use in a chromatographic separation device of any one of clauses 20-41, wherein the porous particle packing material is used in an SEC column, the porous particle packing material can spate out biomolecules in the range of 10 to 4000 kD.

43. The material for use in a chromatographic separation device of any one of clauses 20-41, wherein the porous particle packing material is used in an SEC column, the porous particle packing material can spate out biomolecules in the range of 100 to 3000 kD.

44. The material for use in a chromatographic separation device of any one of clauses 20-41, wherein the porous particle packing material is used in an SEC column, the porous particle packing material can spate out biomolecules in the range of 200 to 2000 kD.

45. The material for use in a chromatographic separation device of any one of clauses 20-41, wherein the porous particle packing material is used in an SEC column, the porous particle packing material can spate out biomolecules in the range of 300 to 1,500 kD.

46 The material for use in a chromatographic separation device of any one of clauses 20-41, wherein the porous particle packing material is used in an SEC column, the porous particle packing material can spate out biomolecules in the range of 1,000 to 3,000 kD.

47. A chromatographic separation system comprising:
at least two columnar member positioned in series, each of the first and second columnar members having an inner void;
at least one stationary phase packing material within each of the first inner void and second inner void;
wherein the stationary phase packing material comprises the surface modified porous particle material.

48. The chromatographic separation system of clause 47, wherein the chromatographic separation system is size exclusion chromatographic system.

49. The chromatographic separation system of any one of clauses 47-48, wherein the surface modified porous particle material comprises silica particles.

50. The chromatographic separation system of any one of clauses 47-49, wherein the surface modified porous particle material in the first columnar member comprises a coating having 3.0-7.0% Carbon and wherein the surface modified porous particle material in the second columnar member comprises a chemical surface modification having 0.5-1.5% carbon.

51. The chromatographic separation system of any one of clauses 47-50, wherein the surface modified porous particle material in at least one columnar member comprises a coating having a diol bonded phase.

52. The chromatographic separation system of any one of clauses 47-51, wherein the surface modified porous particle material in at least one columnar member comprises a coating having thickness of between 3.0-3.7 $\mu mol/m^2$.

53. The chromatographic separation system of any one of clauses 47-52, wherein the porous particle material in the first columnar member comprises silica particles having a final pore volume of 0.7 to 1.1 cc/g and wherein the porous particle material in the second columnar member comprises silica particles having a final pore volume of 0.50-1.00 cc/g.

54. The chromatographic separation system of any one of clauses 47-52, wherein the porous particle material in the first columnar member comprises silica particles having a final pore volume of 0.7 to 1.1 cc/g and wherein the porous particle material in the second columnar member comprises silica particles having a final pore volume of 0.6-0.8 cc/g.

56. The chromatographic separation system of any one of clauses 47-52, wherein the porous particle material in the second columnar member comprises silica particles having an average initial pore size of about 225-280 Angstroms and an average final pore size of about 195-270 Angstroms.

57. The chromatographic separation system of any one of clauses 47-56, wherein the porous particle material in the first columnar member comprises silica particles having an average final pore size of about 600 to 700 Å and wherein the porous particle material in the second columnar member comprises silica particles having an average final pore size of about 195-270 Angstroms.

58. The chromatographic separation system of any one of clauses 47-57, wherein the at least one columnar member has a length of 100 mm, 150 mm or 300 mm.

59. The chromatographic separation system of any one of clauses 47-58, wherein the inner void of the at least one columnar member has a diameter between 2.1 mm-7.8 mm.

60. The chromatographic separation system of any one of clauses 47-59, used for the separation of molecules selected from monoclonal antibodies, immunoglobulins, protein complexes, Oligonucleotides, Oligosaccharides, protein aggregates, peptides, and/or other biomolecules, or a combination thereof.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A size-exclusion chromatographic separation device comprising:
a columnar member having an inner volume; and
a size-exclusion stationary phase packing material disposed within the inner volume and comprising a surface-modified porous particle material configured to separate adeno-associated virus monomers from adeno-associated virus aggregates, wherein the surface-modified porous particle material comprises:
silica particles having a final pore volume between 0.6 and 0.8 cc/g and an average final pore size between about 600 and 800 Å; and
a chemical surface modification having a diol bonded phase formed by epoxy ring-opened glycidoxypropyltrimethoxysilane moieties covalently bound to the silica particles.

2. The size-exclusion chromatographic separation device of claim 1, wherein the surface-modified porous particle material comprises carbon and has a percentage of carbon between 0.5 and 1.5% carbon.

3. The size-exclusion chromatographic separation device of claim 1, wherein the surface-modified porous particle material comprises a ligand and has a ligand density between 2.5 and 4.5 $\mu mol/m^2$.

4. A method of separating adeno-associated virus monomers from adeno-associated virus aggregates using the size-exclusion chromatographic separation device of claim 1, the method comprising:
loading a mixture having adeno-associated virus monomers and adeno-associated virus aggregates onto the chromatographic separation device;
flowing the mixture across the size-exclusion stationary phase packing material such that the adeno-associated virus monomers enter the final pore volume of the surface-modified porous particle material;
eluting the adeno-associated virus aggregates from the surface-modified porous particle material; and
eluting the adeno-associated virus monomers from the surface-modified porous particle material after eluting the adeno-associated virus aggregates whereby the adeno-associated virus monomers are separated from the adeno-associated virus aggregates.

* * * * *